US011144575B2

(12) United States Patent
Chapman et al.

(10) Patent No.: US 11,144,575 B2
(45) Date of Patent: Oct. 12, 2021

(54) ASSISTING A USER TO IDENTIFY OUTLIERS AND ANOMALIES IN A DATASET

(71) Applicant: Kyvos Insights, Inc., Los Gatos, CA (US)

(72) Inventors: Leigh Chapman, Victoria (CA); Kavindra Singh, Madhya Pradesh (IN); Dharmendra Singh Chouhan, Madhya Pradesh (IN); Pratik Jain, Madhya Pradesh (IN)

(73) Assignee: KYVOS INSIGHTS, INC., Los Gatos, CA (US)

( * ) Notice: Subject to any disclaimer, the term of this patent is extended or adjusted under 35 U.S.C. 154(b) by 631 days.

(21) Appl. No.: 15/233,154

(22) Filed: Aug. 10, 2016

(65) Prior Publication Data

US 2017/0046419 A1 Feb. 16, 2017

Related U.S. Application Data

(60) Provisional application No. 62/203,947, filed on Aug. 12, 2015.

(51) Int. Cl.
*G06F 16/30* (2019.01)
*G06F 16/28* (2019.01)

(52) U.S. Cl.
CPC .................. *G06F 16/283* (2019.01)

(58) Field of Classification Search
CPC .................................................... G06F 16/283
See application file for complete search history.

(56) References Cited

U.S. PATENT DOCUMENTS

| 6,094,651 A * | 7/2000 | Agrawal | G06F 16/283 |
| 6,750,864 B1 * | 6/2004 | Anwar | G06T 11/206 |
| | | | 345/440 |
| 7,308,139 B2 | 12/2007 | Wentland et al. | |
| 7,716,173 B2 | 5/2010 | Stolte et al. | |
| 7,800,613 B2 | 9/2010 | Hanrahan et al. | |
| 8,938,416 B1 * | 1/2015 | Cole | G06F 16/283 |
| | | | 707/607 |

(Continued)

OTHER PUBLICATIONS

Article entitled "Hierarchy-Driven Visual Exploration of Multidimensional Data Cubes", by Mansmann et al., dated 2007 (Year: 2007).*

(Continued)

*Primary Examiner* — Mahesh H Dwivedi
(74) *Attorney, Agent, or Firm* — Hayes Soloway P.C.

(57) ABSTRACT

The present disclosure relates to system(s) and method(s) for data processing and visualization. The system is configured to enable processing and visually representing a dataset specified by a user. Initially, the system accepts a rule corresponding to at least one dimension associated with the dataset, wherein the rule is associated with a lower level of abstraction. When a rollup operation is performed along the specified dimension of the dataset for generating higher level graphical representation, the system is configured to preserve the rule associated with the dataset, regardless of any mathematical or logical cancellation of values due to the rollup operation and reflects the lower level details at a higher level of abstraction.

14 Claims, 8 Drawing Sheets

(56) References Cited

U.S. PATENT DOCUMENTS

| | | | | |
|---|---|---|---|---|
| 2005/0288883 A1* | 12/2005 | Folting | ............... | G06F 16/283 |
| | | | | 702/102 |
| 2007/0282789 A1* | 12/2007 | Deshpande | ........... | G06F 16/283 |
| 2011/0261049 A1* | 10/2011 | Cardno | ................. | G06Q 10/10 |
| | | | | 345/419 |
| 2012/0169739 A1 | 7/2012 | Meder | | |
| 2013/0298085 A1* | 11/2013 | Kritt | ..................... | G06F 3/0488 |
| | | | | 715/863 |
| 2015/0112969 A1* | 4/2015 | Prabhu | .................. | G06Q 10/06 |
| | | | | 707/722 |
| 2015/0113451 A1* | 4/2015 | Kopp | .................... | G06Q 10/10 |
| | | | | 715/764 |
| 2016/0103838 A1* | 4/2016 | Sainani | .............. | H04L 41/5012 |
| | | | | 707/725 |

OTHER PUBLICATIONS

Article entitled "Anomaly Detection using Hadoop and MapReduce Technique in Cloud with Sensor Data", by Alussein et al., dated Sep. 2015 (Year: 2015).*

Amir Semmo and Jürgen Döllner , An Interaction Framework for Level-of-Abstraction Visualization of 3D Geovirtual Environments, Nov. 2014, 8 - pages.

* cited by examiner

Prior Art

ASSISTING A USER TO IDENTIFY OUTLIERS AND ANOMALIES IN A DATASET

CROSS-REFERENCE TO RELATED APPLICATIONS AND PRIORITY

The present application claims priority from provisional patent application entitled "SYSTEM AND METHOD FOR GRAPHICALLY REPRESENTING LOWER LEVEL DETAILS AT A HIGHER LEVEL OF VISUALIZATION" having U.S. Provisional Application No. 62/203,947, filed on Aug. 12, 2015, the entire disclosure of which is incorporated herein by reference.

TECHNICAL FIELD

The present disclosure in general relates to the field of data processing. More particularly, the present invention relates to a system and method for graphically representing data and identifying region of interest.

BACKGROUND

Now-a-days, with developments in the field of Information Technology (IT), data analysis and reporting have gained vital importance in the continuously changing global market. Many organizations rely on data analysis and business intelligence software to take critical business decisions in their organization. For the purpose of market research, some of the organizations maintain a data warehouse for capturing and storing market research data. The market research data is then processed by an online analytical processing (OLAP) tool for generating data cubes. The data cubes are multidimensional in nature and enable analytical processing at a faster rate. A user may select multiple dimensions and associated parameters for generating 2D and 3D graphs which helps the management team in taking crucial business decisions. These graphs may be summarized in a report and submitted to the management team for taking crucial business decisions.

At the time of generating the reports from the OLAP tool, the user may define rules for each data block under analysis. The rules are configured to identify different data points of interest to a user. If these rules match a predefined condition, the data block is displayed in a way unique from other data blocks. For example, the user may specify a rule to cause all bars in a bar chart to be displayed in red when their corresponding values are less than a specified threshold, whereas all other bars should be displayed in green. Further, it is also common within the Business Intelligence (BI) software to collapse or rollup values while analyzing the data. For example, the user of the report may allow the management team to perform a rollup operation for summing all values for a geographic region and show the result for a larger region. However, when a rollup operation is performed, the conditions set at a lower level of abstraction are over ridden due to collation/summation of data values at a higher level of abstraction.

For instance, in one example, states A and B are having the same sales target forecasted for a given period. Sales for state A are twenty percent less than forecast, whereas Sales for state B are twenty percent over forecast. In this example, on a graph of sales by state, the bar representing state A would be highlighted and the bar representing state B would not be highlighted. However, with the same conditions in place, when sales for the states are rolled up to represent the sales for the country, the fact of the predefined rule is lost since the sales below forecast for state A and above forecast for state B cancel each other mathematically. Further, there is no defined way to display summarized data at higher level based on the rules defined for a lower level of abstraction.

Figure 8:
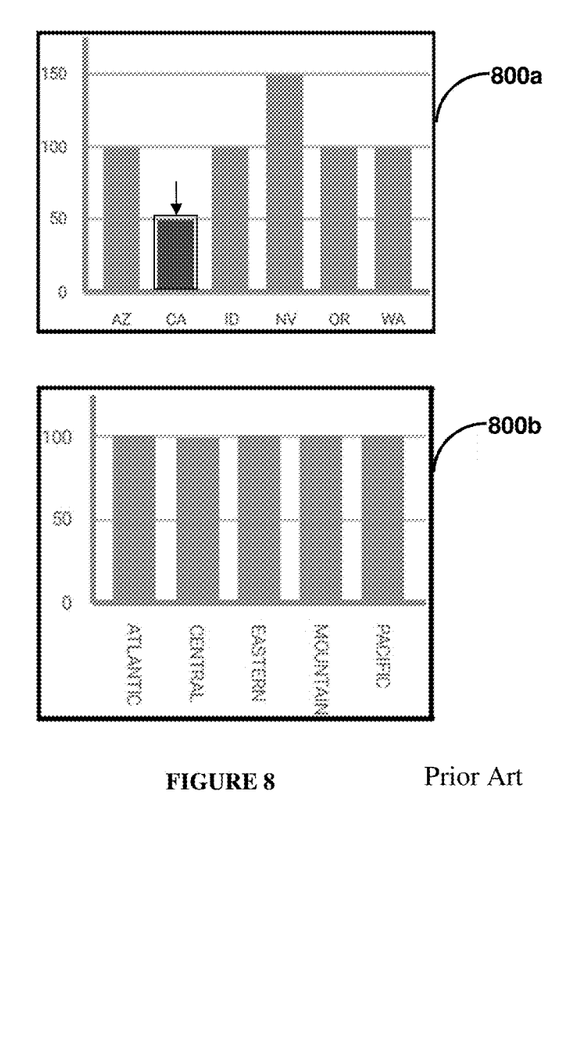
FIG. 8 illustrates graphical representation of data, generated by data processing systems available in the art.

Referring to FIG. 8, different graphical representations generated by existing data processing systems in the art are represented. As illustrated, a graphical representation 800a represents sales data corresponding to different states in the pacific region of the United States. At the time of generating this graphical representation, a rule to highlight all the states having sale below 50 million dollars in dark grey is specified. Since the graphical representation 800a and the rule are at the same level of abstraction, the bar corresponding to CA is highlighted in the graphical representation 800a. However, when a rollup operation is performed over the data processing systems available in the art, a graphical representation 800b corresponding to different regions in the United States and their corresponding sales data is generated from the graphical representation 800a. However, due to the rollup operation, the lower level rule is overruled resulting into a plane graph without any indications to identify the region of interest. As a result the end user has to search through the entire graphical representation 800b area by area to find any region of interest.

SUMMARY

This summary is provided to introduce aspects related to systems and methods for assisting a user to identify a region of interest in data and the aspects are further described below in the detailed description. This summary is not intended to identify essential features of the claimed disclosure nor is it intended for use in determining or limiting the scope of the claimed disclosure.

In one embodiment, a system for assisting a user to identify a region of interest in a dataset is disclosed. The system comprises a memory and a processor coupled to the memory. The processor is configured to execute program instructions stored in the memory. In one embodiment, the processor may execute program instructions stored in the memory for processing raw data using Online Analytical Processing (OLAP) to generate a processed dataset. The processed dataset may comprise a set of abstraction levels. Further, the set of abstraction levels are hierarchal arranged, wherein each abstraction level comprises a set of data nodes. In one embodiment, each data node at an abstraction level may be associated with a subset of the set of data nodes in a preceding abstraction level. Further, the processor may execute program instructions stored in the memory for accepting a rule corresponding to a target abstraction level from the set of abstraction levels and identify a set of target data nodes corresponding to the rule from the target abstraction level. Further, the processor may execute program instructions stored in the memory for identifying a set of intermediate data nodes connecting a source data node at a first abstraction level and the set of target data nodes. Further, the processor may execute program instructions stored in the memory for generating a multi layer graphical representation corresponding to the set of abstraction levels with a set of visual indicators. In one embodiment, each visual indicator is associated with at least one of the source data node, the set of intermediate data nodes, and the set of target data nodes. Further, the processor may execute program instructions stored in the memory for displaying the multi layer graphical representation over an output device, thereby assisting a user identify a region of interest in the processed dataset, in the multi layer graphical representation, corresponding to the set of target data nodes.

A method for assisting a user to identify a region of interest in a dataset is discloses. The method comprises processing raw data using Online Analytical Processing (OLAP) to generate a processed dataset. The processed dataset may comprise a set of abstraction levels. Further, the set of abstraction levels are hierarchal arranged, wherein each abstraction level comprises a set of data nodes. In one embodiment, each data node at an abstraction level may be associated with a subset of the set of data nodes in a preceding abstraction level. The method further comprises accepting a rule corresponding to a target abstraction level from the set of abstraction levels and identify a set of target data nodes corresponding to the rule from the target abstraction level. The method further comprises identifying a set of intermediate data nodes connecting a source data node at a first abstraction level and the set of target data nodes. The method further comprises generating a multi layer graphical representation corresponding to the set of abstraction levels with a set of visual indicators. In one embodiment, each visual indicator is associated with at least one of the source data node, the set of intermediate data nodes, and the set of target data nodes. The method further comprises displaying the multi layer graphical representation over an output device, thereby assisting a user identify a region of interest in the processed dataset, in the multi layer graphical representation, corresponding to the set of target data nodes.

A non-transitory computer readable medium embodying a program executable in a computing device for assisting a user to identify a region of interest in a dataset is disclosed. The program comprises a program code for processing raw data using Online Analytical Processing (OLAP) to generate a processed dataset. The processed dataset may comprise a set of abstraction levels. Further, the set of abstraction levels are hierarchal arranged, wherein each abstraction level comprises a set of data nodes. In one embodiment, each data node at an abstraction level may be associated with a subset of the set of data nodes in a preceding abstraction level. The program comprises a program code for accepting a rule corresponding to a target abstraction level from the set of abstraction levels. The program comprises a program code for identifying a set of target data nodes corresponding to the rule from the target abstraction level. The program comprises a program code for identifying a set of intermediate data nodes connecting a source data node at a first abstraction level and the set of target data nodes. The program comprises a program code for generating a multi layer graphical representation corresponding to the set of abstraction levels with a set of visual indicators. In one embodiment, each visual indicator is associated with at least one of the source data node, the set of intermediate data nodes, and the set of target data nodes. The program comprises a program code for displaying the multi layer graphical representation over an output device, thereby assisting a user identify a region of interest in the processed dataset, in the multi layer graphical representation, corresponding to the set of target data nodes.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

In one embodiment a system is configured to perform Online Analytical Processing (OLAP) for processing and visually representing a processed dataset specified by a user. Initially, the system accepts a business rule hereafter referred to as the rule corresponding to at least one dimension associated with the dataset, wherein business rule is associated with a lower level of abstraction. When a rollup operation is performed along the specified dimension of the dataset for generating higher level graphical representations, the system is configured to preserve the rule associated with the dataset, regardless of any mathematical or logical cancellation of values due to the rollup operation and reflects the rule defined for the lower level abstraction at a higher level of abstraction.

For the purpose of preserving the rule associated with lower level of abstraction, the system is configured to generate a higher level graphical representation with a plurality of Metagraphs embedded therein. Each Metagraph stores the expression of data that match the rule, referred to as a region of interest. Further, the system enables a single visualization with a plurality of Metagraphs hereafter referred to as multi layer graphical representation, allowing the user to identify the region of interest in the graphical representation associated with higher level of abstraction. The multi layer graphical representations with Metagraphs enables in creating concise visual patterns with highlighted region of interest extracted from large amount of detailed data.

While aspects of described system and method for data analysis and visualization may be implemented in any number of different computing systems, environments, and/or configurations, the embodiments are described in the context of the following exemplary system.

Figure 1:
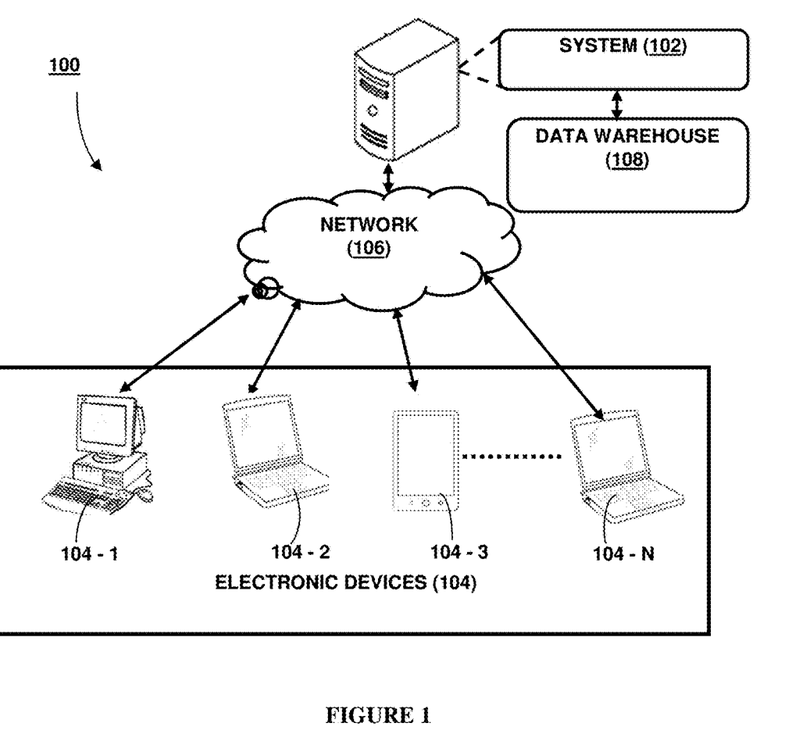
FIG. 1 illustrates a network implementation of a system for assisting a user to identify a region of interest in a dataset, in accordance with an embodiment of the present disclosure.

Referring now to FIG. 1, a network implementation 100 of a system 102 to perform data analysis and visualization over a dataset for assisting a user in identifying a region of interest in a dataset is disclosed. Although the present disclosure is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106. Further, the system 102 is connected to a data warehouse 108 storing raw data captured through different market researches. In one embodiment, the raw data may be processed using Online Analytical Processing (OLAP) tool to generate processed dataset such as a data cube, which are also stored at the data warehouse 108.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like. The system 102 to perform data analysis and visualization over the processed dataset for assisting the user in identifying the region of interest in the processed dataset is further explained with reference to FIG. 2.

Figure 2:
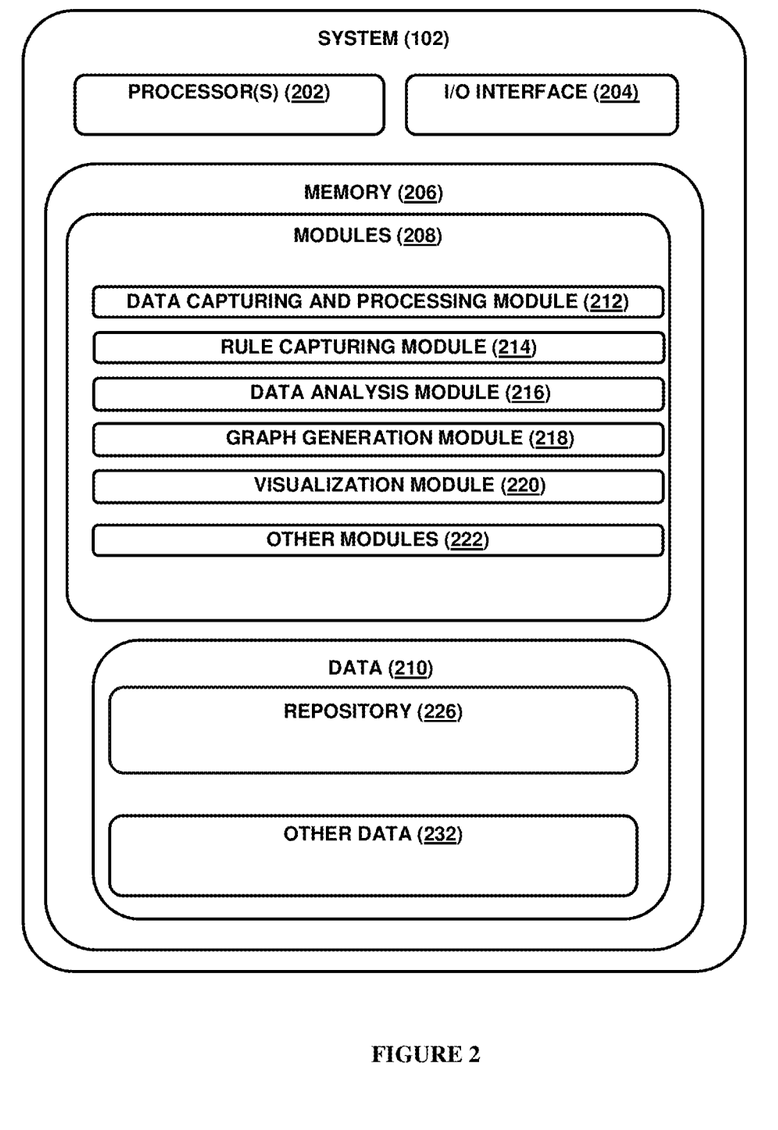
FIG. 2 illustrates the system, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a data capturing and processing module 212, a rule capturing module 214, a data analysis module 216, a graph generation module 218, a visualization module 220, and other modules 222. The other modules 222 may include programs or coded instructions that supplement applications and functions of the system 102.

The data 210, amongst other things, serves as a repository for storing data processed, received, and generated by one or more of the modules 208. The data 210 may also include a repository 226, and other data 232. In one embodiment, the repository 226 may be configured to store at least one processed dataset and preset conditions/rules associated therewith the processed dataset.

In one embodiment, the other data 232 may include data generated as a result of the execution of one or more modules in the other modules 220. In one implementation, at first, a user may use the client device 104 to access the system 102 via the I/O interface 204. The user may register using the I/O interface 204 in order to use the system 102. In one embodiment, once the user registers to the system 102, the user may specify a raw data to be visualized, from the data warehouse 108 or any other type of data repository. Once the user specifies the raw data, the data capturing and processing module 212 is configured to retrieve the raw data from the data warehouse 108 and store it in the repository 226 for further processing.

Further, the data capturing and processing module 212 may process the raw data using Online Analytical Processing (OLAP) to generate a processed dataset. The processed dataset may be a multi dimensional data cube comprising a set of abstraction levels. In one embodiment, each abstraction level from the set of abstraction levels is generated by aggregating raw data along different dimensions corresponding to the raw data. The set of abstraction levels are hierarchal arranged, wherein each abstraction level comprises a set of data nodes. In one embodiment, each data node at an abstraction level may be associated with a subset of the set of data nodes in a preceding abstraction level, wherein each data nodes is configured to maintain aggregated data corresponding to the subset of the set of data nodes in the preceding abstraction level.

Further, the rule capturing module 214 may accept a rule corresponding to a target abstraction level from the set of abstraction levels. The rule may be a business rule specified by the user of the system 102. The rule comprises one or more conditions defined by the user in order to identify the outliers/region of interest in the processed dataset.

Further, the data analysis module 216 may identify a set of target data nodes corresponding to the rule from the target abstraction level. In one embodiment, the set of target data nodes are identified by the data analysis module 216 based on comparison of the aggregated data stored at each data node in the target abstraction level with one or more conditions specified in the rule.

Further, the data analysis module 216 may identify a set of intermediate data nodes connecting a source data node at a first abstraction level and the set of target data nodes. The source data node acts as a starting point to begin the analysis of the processed dataset. For example, there may be more than one data nodes in the first abstraction level. The system is configured to identify at least one data node as source data node, if any of the set of target data nodes may be accessed using source data node.

Further, the graph generation module 218 may generate a multi layer graphical representation corresponding to the set of abstraction levels with a set of visual indicators. In one embodiment, the multi layer graphical representation comprises a graph corresponding to each abstraction level in the processed dataset. In one embodiment, each graph may represent the set of data nodes in the abstraction level using graphical representation. For example, a graph may be a bar chart, wherein each bar refers to a data node in that abstraction level. The bar may used by the user to perform drilldown operation and analyze the data nodes of lower level of abstraction corresponding to the bar. For example, the user may click on the bar in the graph and view a graph representing lower level of abstraction linked with the bar. Further, the graph generation module 218 is conjured to represent the source data node, the set of intermediate data nodes, and the set of target data nodes using visual indicators. For example, the source data node may be highlighted using different color code, such that the user may be able to identify the source node from rest of the nodes in the first abstraction level.

Further, the visualization module 220 may display the multi layer graphical representation over an output device such as a monitor. The output device enables graph by graph navigation in the multi layer graphical representation using rollup and drilldown operations. In one embodiment, the region of interest corresponds to a region representing the target data nodes on a graph associated with the target level of abstraction. The output device assists the user in identifying the region of interest in the processed dataset using the set of visual indicators in the multi layer graphical representation. In one embodiment, the set of visual indicators may be a color code, highlight, comment, or a checkbox. The process of perform data analysis and visualization over the processed dataset for assisting the user in identifying the region of interest in the processed dataset is further elaborated with respect to the block diagram of FIG. 3.

Figure 3:
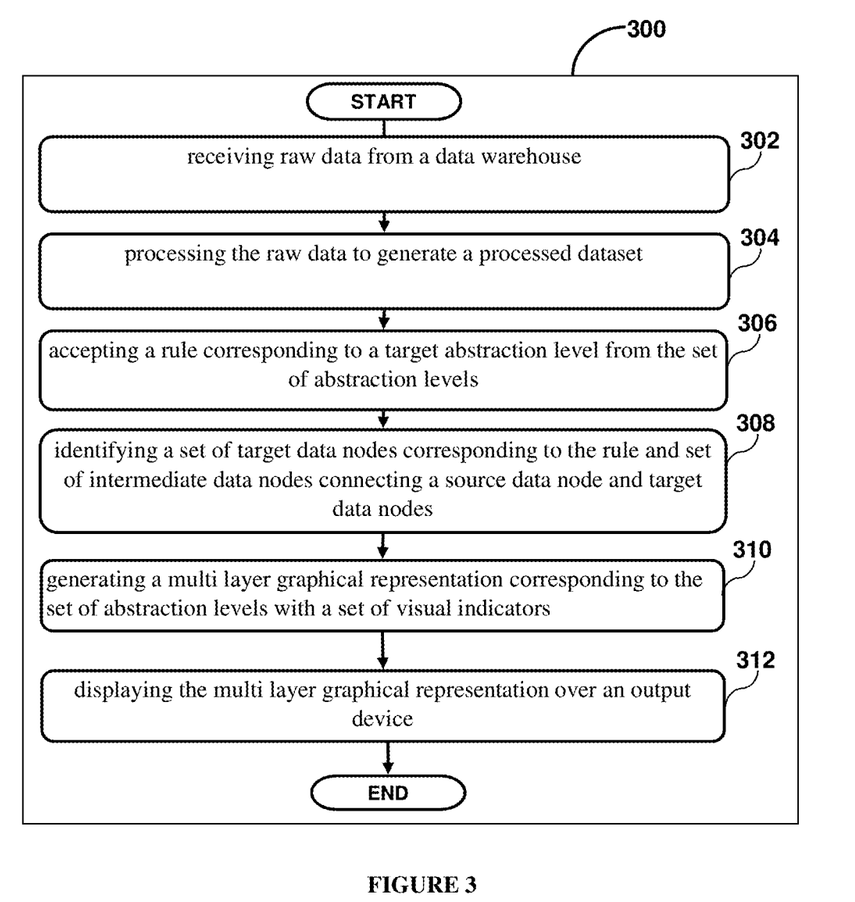
FIG. 3 illustrates a block diagram for assisting the user to identify the region of interest in the dataset, in accordance with an embodiment of the present disclosure.

Referring now to FIG. 3, a method 300 for perform data analysis and visualization over the processed dataset for assisting the user in identifying the region of interest in the processed dataset is illustrated, in accordance with an embodiment of the present disclosure. The method 300 may be described in the general context of computer executable instructions. Generally, computer executable instructions can include routines, programs, objects, components, data structures, procedures, modules, functions, and the like, that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the disclosure described herein. Furthermore, the method can be implemented in any suitable hardware, software, firmware, or combination thereof. However, for ease of explanation, in the embodiments described below, the method 300 may be considered to be implemented in the above described system 102.

At block 302, once the user registers to the system 102, the user may specify a raw data to be visualized, from the data warehouse 108 or any other type of data repository. Once the user specifies the raw data, the data capturing and processing module 212 is configured to retrieve the raw data from the data warehouse 108 and store it in the repository 226 for further processing. Further, the data capturing and processing module 212 may process the raw data using Online Analytical Processing (OLAP) to generate a processed dataset. The processed dataset may be a multi dimensional data cube comprising a set of abstraction levels. In one embodiment, each abstraction level from the set of abstraction levels is generated by aggregating raw data along different dimensions corresponding to the raw data. The set of abstraction levels are hierarchal arranged, wherein each abstraction level comprises a set of data nodes. In one embodiment, each data node at an abstraction level may be associated with a subset of the set of data nodes in a preceding abstraction level, wherein each data nodes is configured to maintain aggregated data corresponding to the subset of the set of data nodes in the preceding abstraction level.

At block 304, the rule capturing module 214 may accept a rule corresponding to a target abstraction level from the set of abstraction levels. The rule may be a business rule specified by the user of the system 102. The rule comprises one or more conditions defined by the user in order to identify the outliers/region of interest in the processed dataset.

At block 306, the data analysis module 216 may identify a set of target data nodes corresponding to the rule from the target abstraction level. In one embodiment, the set of target data nodes are identified by the data analysis module 216 based on comparison of the aggregated data stored at each data node in the target abstraction level with one or more conditions specified in the rule.

At block 308, the data analysis module 216 may identify a set of intermediate data nodes connecting a source data node at a first abstraction level and the set of target data nodes. The source data node acts as a starting point to begin the analysis of the processed dataset. For example, there may be more than one data nodes in the first abstraction level. The system is configured to identify at least one data node as source data node, if any of the set of target data nodes may be accessed using source data node.

At block 310, the graph generation module 218 may generate a multi layer graphical representation corresponding to the set of abstraction levels with a set of visual indicators. In one embodiment, the multi layer graphical representation comprises a graph corresponding to each abstraction level in the processed dataset. In one embodiment, each graph may represent the set of data nodes in the abstraction level using graphical representation. For example, a graph may be a bar chart, wherein each bar refers to a data node in that abstraction level. The bar may used by the user to perform drilldown operation and analyze the data nodes of lower level of abstraction corresponding to the bar. For example, the user may click on the bar in the graph and view a graph representing lower level of abstraction linked with the bar. Further, the graph generation module 218 is conjured to represent the source data node, the set of intermediate data nodes, and the set of target data nodes using visual indicators. For example, the source data node may be highlighted using different color code, such that the user may be able to identify the source node from rest of the nodes in the first abstraction level.

At block 312, the visualization module 220 may display the multi layer graphical representation over an output device such as a monitor. The output device enables graph by graph navigation in the multi layer graphical representation using rollup and drilldown operations. In one embodiment, the region of interest corresponds to a region representing the target data nodes on a graph associated with the target level of abstraction. The output device assists the user in identifying the region of interest in the processed dataset using the set of visual indicators in the multi layer graphical representation. In one embodiment, the set of visual indicators may be a color code, highlight, comment, or a checkbox.

In one embodiment, the visualization module 220 may plot a cross tab-style matrix, wherein each node in the cross tab-style matrix represents a graph in the multi layer graphical representation. If the underlying graph of a data node does not have one or more points of interest in its related graph, the visualization module 220 displays an unremarkable marker in the data node and if the underlying graph of a data node contains one or more points of interest in its related graph the visualization module 220 displays a remarkable marker in the data node. Further, if the cardinality of a dimension exceeds a predetermined limit, the visualization module 220 omits labels for that axis. Once all the graphs in the multi layer graphical representation are created, an end user may use the multi layer graphical representation to view lower level abstraction details in each graph of the multi layer graphical representation.

In one embodiment, the user may interact with the multi layer graphical representation through a variety of methods as mentioned below:
  The end user may use a cursor pointer to point to a node in the graph, wherein pointing to the node causes the application to display a transient dialog.
  The end user may tap a node to display a transient dialog.
  The end user may use a secondary click to cause the graph to display a contextual menu.
  The end user may long-press or force-press a data node to display a contextual menu.
  The end user may find region/points of interests within the multi layer graphical representation based on the type of marker displayed by the visualization module 220 for an individual node. It is to be noted that a remarkable marker has a different appearance from an unremarkable marker. The end user may use each remarkable marker to direct his/her attention to points that are more likely to require attention. The visualization module 220 may further enable animation in the graph to distinguish the two types of markers. The animation may be generated in form of ripple effect to increase the effective visual area of the remarkable marker to be greater than the area immediately covered by the unremarkable marker.
  The end user may view description of a specific point of interest and a description of why the related node was marked as a point of interest.
  The visualization module 220 may enable the end user to draw focus to each point of interest in turn.
  The visualization module 220 may enable the end user to draw focus to a previous point of interest.

In one embodiment, the end user may direct the visualization module 220 to generate the visual representation for enabling navigation between points of interest using a variety of methods:
  the end user may use a next and previous buttons presented in the graphical representation,
  the end user may use Right and Left arrow keys on a keyboard,
  the end user may use a left or right swipe gesture on a track pad to indicate that the multi layer graphical representation should highlight another point of interest.

In one embodiment, when all points of interest for the current state of the visualization have been reviewed, the visualization module 220 draws the user's focus to the first point of interest and indicates that the user is again looking at the first point of interest. The visualization module 220 may also enable the end user to expand or collapse the visualization by selecting a point of interest and choosing one of three options:
  The end user may expand a data node. In this scenario, the visualization module 220 responds by expanding the next level of abstraction available for all dimensions directly referenced by the data node.
  The end user may expand a row. In this scenario, the visualization module 220 responds by expanding the next level of hierarchy available for dimensions on the x axis directly referenced by the data node.
  The end user may expand a column. In this scenario, the visualization module 220 responds by expanding the next level of hierarchy available for dimensions on the y axis directly referenced by the data node.

The end user may direct the visualization module 220 to create a report based on the current node by choosing one of three options:
  The end user may instruct to generate a report on a data node. In this case, the visualization module 218 responds by creating a report containing data for the selected row and column intersection of the data node.
  The end user may instruct to generate a report on a row. In this case, the visualization module 220 responds by creating a report containing data for the entire row referenced by the node and the column directly referenced by the data node.
  The end user may instruct to generate a report on a column; In this case, the visualization module 220 responds by creating a report containing data for the entire column referenced by the data node and the row directly referenced by the data node.

Figure 4:
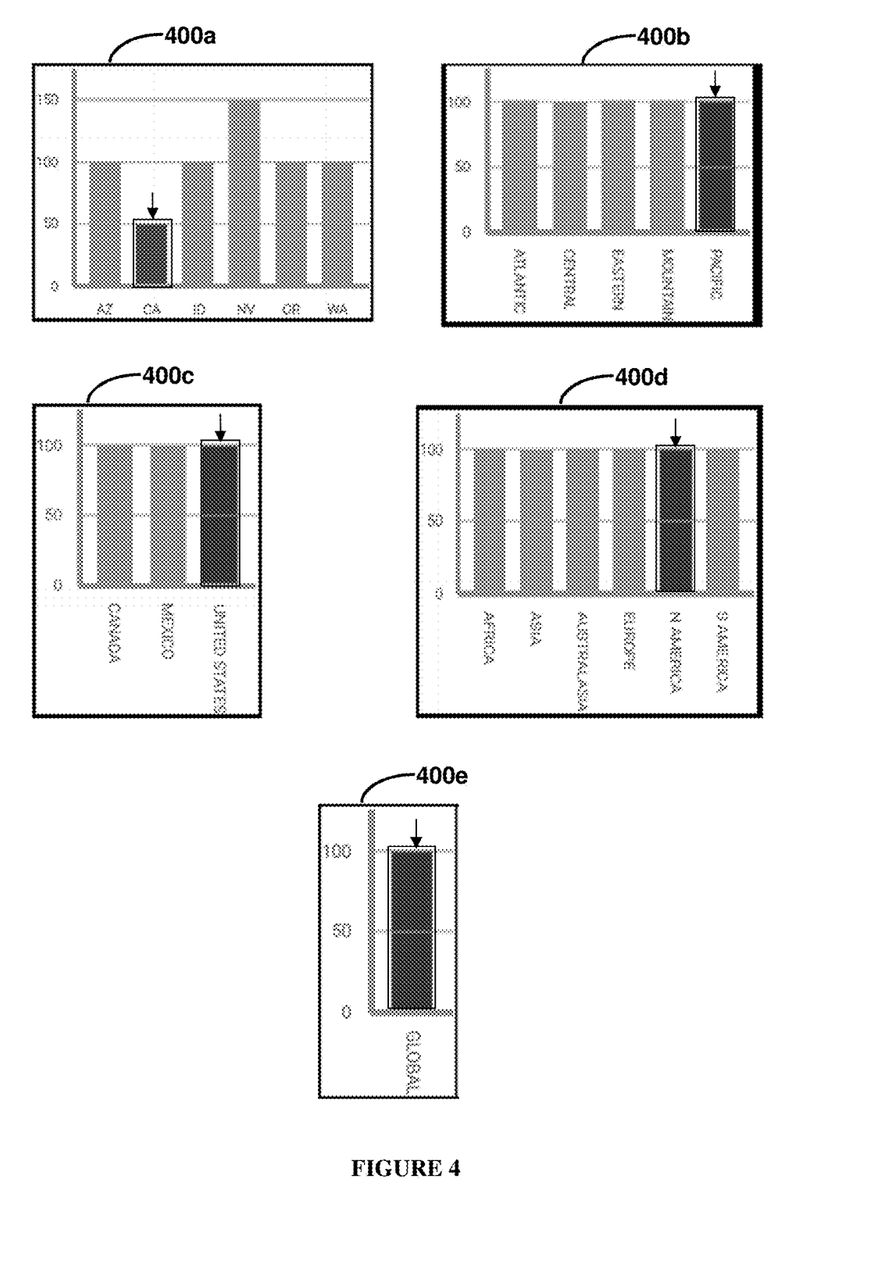
FIGS. 4, 5, 6 and 7 illustrate multi layer graphical representations of the dataset, generated by the system, in accordance with an embodiment of the present disclosure.

Referring now to FIG. 4, the multi layer graphical representation generated by the system 102 is disclosed. In one embodiment, a graphical representation 400a, generated by the visualization module 220, represents sales data corresponding to different states in the pacific region of the United States. At the time of generating the graphical representation 400a, a rule to highlight all the states having sale below 50 million dollars in dark grey is specified by the user. When a rollup operation is performed on the graphical representation 400a, a graphical representation 400b of different regions in the United States and their corresponding sales data is generated. However, since the system 102 is configured to preserve the rules defined at the lower level of abstraction, even after the rollup operation is performed, the bar representing the pacific region is highlighted in red. This helps the end user in identifying the pacific region in the United States that pertain some anomalies/region of interest that needs attention of the end user. In a similar manner, the graphical representation 400b may be rolled up to generate graphical representations 400c, 400d and 400e corresponding to country, continent and global data representation. In each of these graphical representations, the lower level rules are preserved and the bar representing the region, the country, the continent as well as the global level is highlighted.

Figure 5:
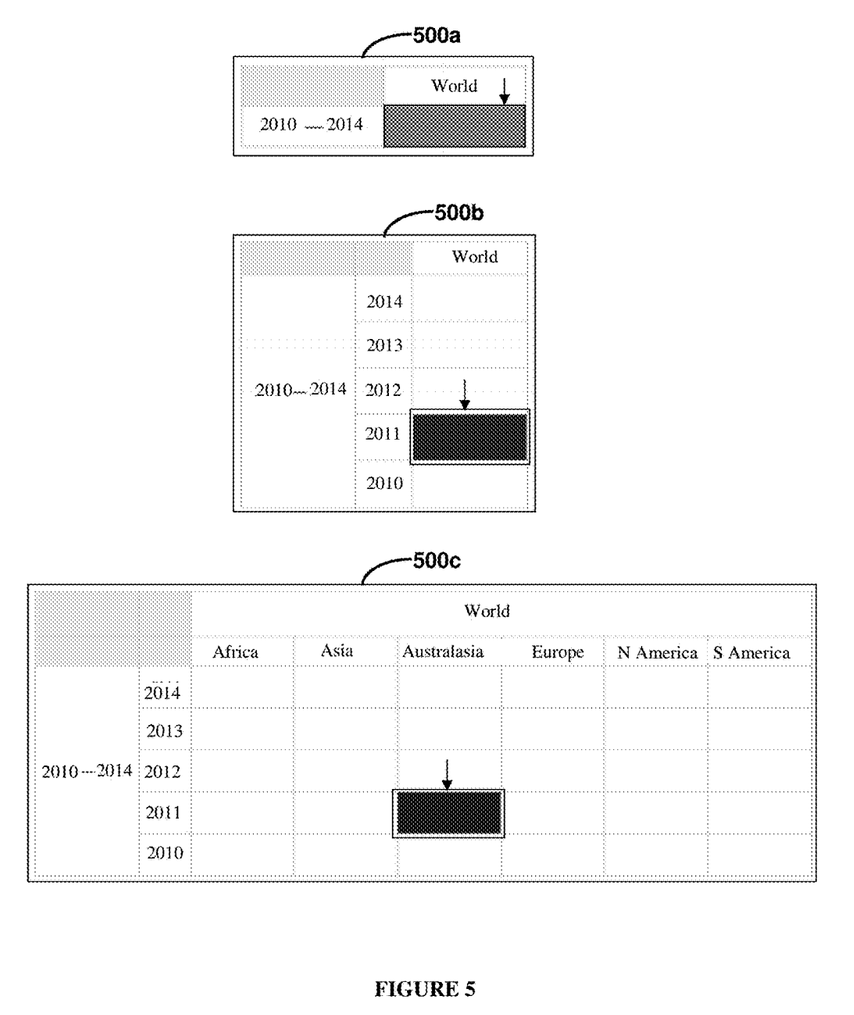
Figure 6:
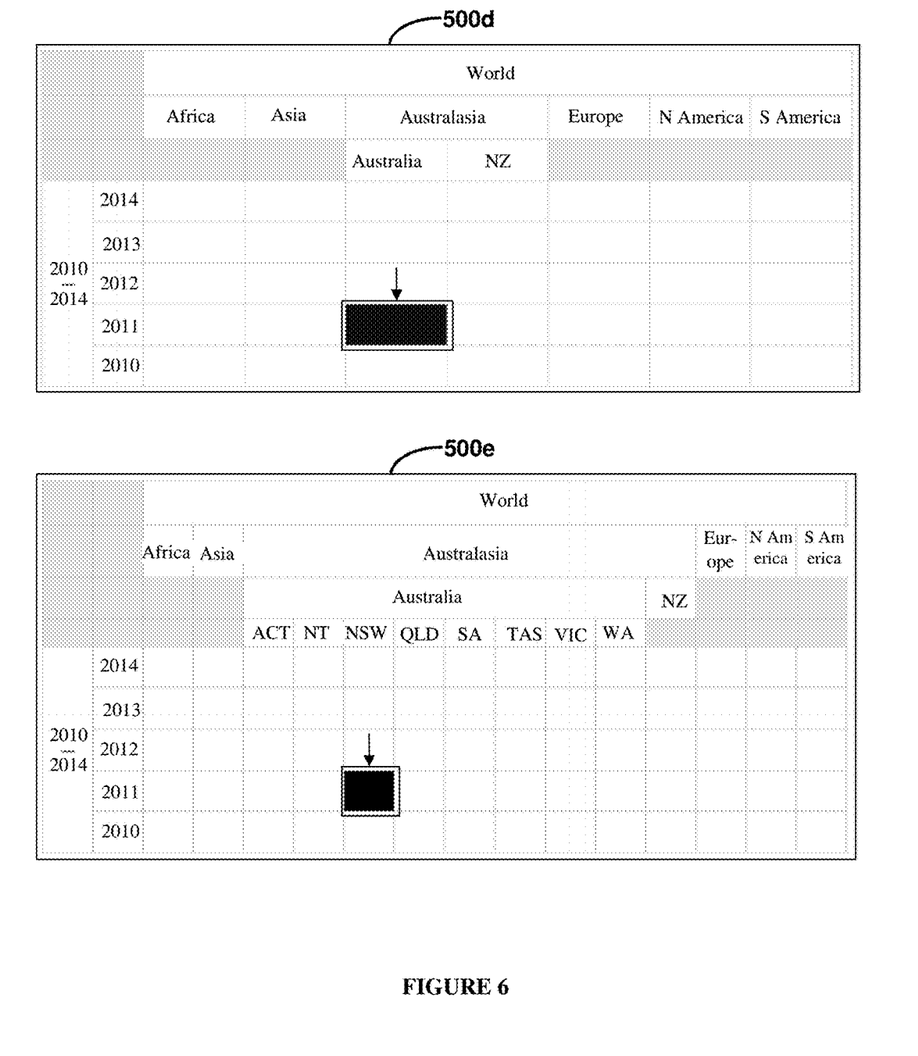
Figure 7:
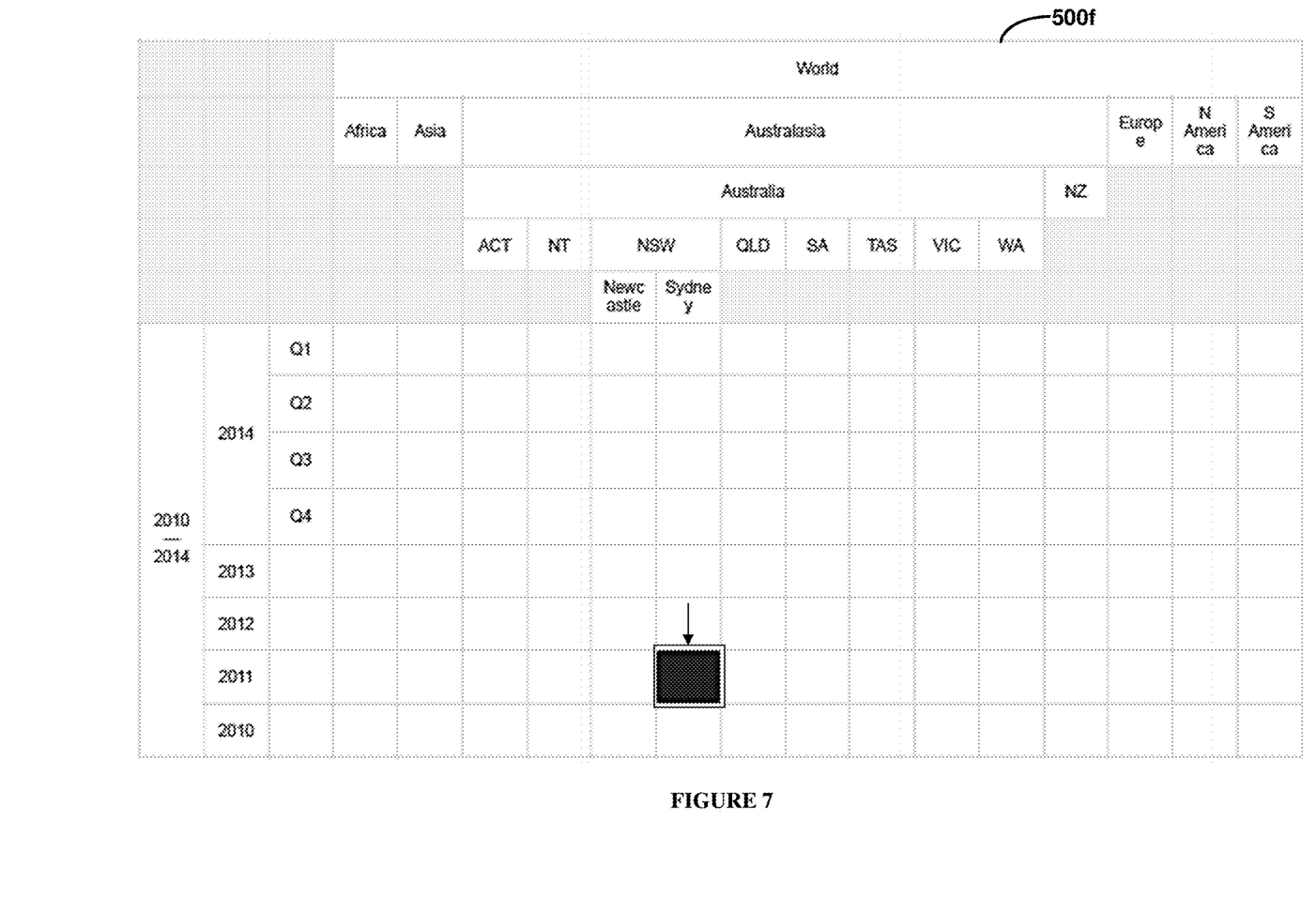

Referring now to FIGS. 5, 6 and 7, a graphical representation 500a generated by the system 102 is illustrated. The dark grey block in the graphical representation 500a indicates that there are points of interest in the dataset represented by the graphical representation 500a with the highest level of abstraction of the dataset.

The user may select the highlighted block in order to drill down into the dataset along Y axis and the system 102 automatically generates graphical representations 500*b* showing that there is a point of interest at year 2011.

Further, the user may extend the 2011 block along X axis to generate the graphical representation 500*c*. The graphical representation 500*c* indicates that the point of interest during the year 2011 is present in the Continent of Australasia.

Further, the user may extend the 2011-Australia block along X axis to generate the graphical representation 500*d*. The graphical representation 500*d* indicates that the point of interest during the year 2011 is present in Australia.

Further, the user may expand the highlighted Australia block along the X axis to generate the graphical representation 500*e*. The graphical representation 500*e* indicates that the point of interest is present in the state New South Wales (NSW).

Furthermore, the user may expand the NSW block along the X axis to generate the graphical representation 500*f*. The graphical representation 500*f* indicates that the point of interest occurs in the city Sydney. The user may continue the drilling down operation through a block representing city Sydney to view the exact point of interests in the selected data for analysis.

Although implementations for methods and systems for data analysis and visualization have been described, it is to be understood that the appended claims are not necessarily limited to the specific features or methods described. Rather, the specific features and methods are disclosed as examples of implementations for data analysis and visualization.

The invention claimed is:

1. A system for assisting a user to identify a region of interest in a dataset, the system comprising:
   a memory; and
   a processor coupled to the memory, wherein the processor is configured to execute program instructions stored in the memory for:
      processing raw data to generate a processed dataset, wherein the processed dataset comprises a set of abstraction levels, wherein the set of abstraction levels are hierarchal arranged, and wherein each abstraction level comprises a set of data nodes, wherein each data node at an abstraction level is associated with a subset of the set of data nodes in a preceding abstraction level, wherein each data node is configured to maintain aggregated data corresponding to the subset of the set of data nodes in a preceding abstraction level;
      accepting a rule corresponding to a target abstraction level from the set of abstraction levels, wherein the rule comprises one or more conditions defined by the user to identify a region of interest;
      identifying a set of target data nodes corresponding to the rule from the target abstraction level, wherein the set of target data nodes are identified based on comparison of the aggregated data stored at each data node in the target abstraction level with the one or more conditions specified in the rule;
      identifying a set of intermediate data nodes connecting a source data node at a first abstraction level and the set of target data nodes;
      generating a multi-layer graphical representation corresponding to the set of abstraction levels with a set of visual indicators, wherein each visual indicator is associated with at least one of the source data node, the set of intermediate data nodes, and the set of target data nodes, wherein the set of visual indicators indicate the region of interest using a remarkable marker and an unremarkable marker, wherein a region point of interest is found by the user, within the multi-layer graphical representation by an remarkable marker or unremarkable marker displayed by the visualization module for an individual node; and wherein the remarkable marker is displayed at the data node when the underlying graph of a data node comprises one or more points of interest, and wherein the unremarkable marker is displayed at the data node when the underlying graph of a data node does not have one or more points of interest; and wherein the remarkable marker has a different appearance from the unremarkable marker; and
      displaying the multi-layer graphical representation over an output device, thereby assisting a user to identify a region of interest in the processed dataset, in the multi-layer graphical representation, corresponding to the set of target data nodes; wherein the output device enables graph by graph navigation in the multi-layer graphical representation using rollup and drilldown operations, and wherein the region of interest corresponds to a region representing the target data nodes on a graph associated with the target level of abstraction.

2. The system of claim 1, wherein the raw data is received from a data warehouse, wherein the raw data is processed using Online Analytical Processing (OLAP), and wherein the processed dataset is a multi-dimensional data cube.

3. The system of claim 1, wherein the each abstraction level from the set of abstraction levels is generated by aggregating raw data along different dimensions corresponding to the raw data.

4. The system of claim 1, wherein the multi-layer graphical representation comprises a graph corresponding to each abstraction level in the processed dataset, wherein each graph represents the set of data nodes in the abstraction level using graphical representation.

5. The system of claim 1, wherein the first abstraction level corresponds to a highest level of abstraction corresponding to the processes dataset.

6. The system of claim 1, wherein the set of visual indicators comprise a colour code, highlight, comment, and checkbox.

7. A method for assisting a user to identify a region of interest in a dataset, the method comprising steps of:
   processing, by a processor, raw data to generate a processed dataset, wherein the processed dataset comprises a set of abstraction levels, wherein the set of abstraction levels are hierarchal arranged, and wherein each abstraction level comprises a set of data nodes, wherein each data node at an abstraction level is associated with a subset of the set of data nodes in a preceding abstraction level wherein each data nodes is configured to maintain aggregated data corresponding to the subset of the set of data nodes in a preceding abstraction level;
   accepting, by the processor, a rule corresponding to a target abstraction level from the set of abstraction levels, wherein the rule comprises one or more conditions defined by the user to identify a region of interest;
   identifying, by the processor, a set of target data nodes corresponding to the rule from the target abstraction level, wherein the set of target data nodes are identified based on comparison of the aggregated data stored at each data node in the target abstraction level with the one or more conditions specified in the rule;

identifying, by the processor, a set of intermediate data nodes connecting a source data node at a first abstraction level and the set of target data nodes;

generating, by the processor, a multi-layer graphical representation corresponding to the set of abstraction levels with a set of visual indicators, wherein each visual indicator is associated with at least one of the source data node, the set of intermediate data nodes, and the set of target data nodes, wherein the set of visual indicators indicate the region of interest using a remarkable marker and an unremarkable marker, wherein a region point of interest is found by the user, within the multi-layer graphical representation by an remarkable marker or unremarkable marker displayed by the visualization module 220 for an individual node; and wherein the remarkable marker is displayed at the data node when the underlying graph of a data node comprises one or more points of interest, and wherein the unremarkable marker is displayed at the data node when the underlying graph of a data node does not have one or more points of interest; and wherein a remarkable marker has a different appearance from an unremarkable marker;

and displaying, by the processor, the multi-layer graphical representation over an output device, thereby assisting a user identify a region of interest in the processed dataset, in the multi-layer graphical representation, corresponding to the set of target data nodes, wherein the output device enables graph by graph navigation in the multi-layer graphical representation using rollup and drilldown operations, and wherein the region of interest corresponds to a region representing the target data nodes on a graph associated with the target level of abstraction.

8. The method of claim 7, wherein the raw data is received from a data warehouse, wherein the raw data is processed using Online Analytical Processing (OLAP), and wherein the processed dataset is a multi dimensional data cube.

9. The method of claim 7, wherein the each abstraction level from the set of abstraction levels is generated by aggregating raw data along different dimensions corresponding to the raw data.

10. The method of claim 7, wherein the rule comprises one or more conditions defined by the user, and wherein the set of target data nodes are identified based on comparison of the aggregated data stored at each data node in the target abstraction level with one or more conditions specified in the rule.

11. The method of claim 7, wherein the multi-layer graphical representation comprises a graph corresponding to each abstraction level in the processed dataset, wherein each graph represents the set of data nodes in the abstraction level using graphical representation.

12. The method of claim 7, wherein the first abstraction level corresponds to a highest level of abstraction corresponding to the processes dataset.

13. The method of claim 7, wherein the set of visual indicators comprise a colour code, highlight, comment, and checkbox.

14. A non-transitory computer readable medium embodying a program executable in a computing device for assisting a user to identify a region of interest in a dataset, the computer program product comprising:

a program code for processing raw data to generate a processed dataset, wherein the processed dataset comprises a set of abstraction levels, wherein the set of abstraction levels are hierarchal arranged, and wherein each abstraction level comprises a set of data nodes, wherein each data node at an abstraction level is associated with a subset of the set of data nodes in a preceding abstraction level, wherein each data nodes is configured to maintain aggregated data corresponding to the subset of the set of data nodes in a preceding abstraction level;

a program code for accepting a rule corresponding to a target abstraction level from the set of abstraction levels, wherein the rule comprises one or more conditions defined by the user to identify a region of interest;

a program code for identifying a set of target data nodes corresponding to the rule from the target abstraction level, wherein the set of target data nodes are identified based on comparison of the aggregated data stored at each data node in the target abstraction level with the one or more conditions specified in the rule;

a program code for identifying a set of intermediate data nodes connecting a source data node at a first abstraction level and the set of target data nodes;

a program code for generating a multi-layer graphical representation corresponding to the set of abstraction levels with a set of visual indicators, wherein each visual indicator is associated with at least one of the source data node, the set of intermediate data nodes, and the set of target data nodes, wherein the set of visual indicators indicate the region of interest using a remarkable marker and an unremarkable marker, wherein a region point of interest is found by the user, within the multi-layer graphical representation by an remarkable marker or unremarkable marker displayed by the visualization module 220 for an individual node; and wherein the remarkable marker is displayed at the data node when the underlying graph of a data node comprises one or more points of interest, and wherein the unremarkable marker is displayed at the data node when the underlying graph of a data node does not have one or more points of interest; and wherein the remarkable marker has a different appearance from the unremarkable marker;

and a program code for displaying the multi-layer graphical representation over an output device, thereby assisting a user to identify a region of interest in the processed dataset, in the multi-layer graphical representation, corresponding to the set of target data nodes, wherein the output device enables graph by graph navigation in the multi-layer graphical representation using rollup and drilldown operations, and wherein the region of interest corresponds to a region representing the target data nodes on a graph associated with the target level of abstraction.

* * * * *